United States Patent [19]

Friend et al.

[11] 3,798,520
[45] Mar. 19, 1974

[54] REVERSING CONTROL SYSTEM FOR ELECTRICALLY POWERED VEHICLES

[75] Inventors: Aaron D. Friend; Gary L. Nelson; Royce A. Yoder, all of Longview, Tex.

[73] Assignee: R. G. LeTourneau, Inc., Longview, Tex.

[22] Filed: May 3, 1971

[21] Appl. No.: 139,659

[52] U.S. Cl. ............................ 318/55, 318/56, 318/158
[51] Int. Cl. .......................................................... H02p 5/26
[58] Field of Search ............. 318/52, 71, 55, 56, 158

[56] References Cited
UNITED STATES PATENTS

| | | | |
|---|---|---|---|
| 3,109,972 | 11/1963 | Edwards | 318/55 |
| 3,183,990 | 5/1965 | Edwards | 318/56 X |
| 2,962,642 | 11/1960 | Brane | 318/55 |
| 2,565,293 | 8/1951 | Aydelott et al. | 318/55 |
| 2,315,386 | 3/1943 | Baldwin | 318/71 X |

*Primary Examiner*—T. E. Lynch
*Attorney, Agent, or Firm*—Wm. T. Wofford; Wofford, Felsman & Fails

[57] ABSTRACT

A control system for effecting reversal of electrically powered vehicles, typically heavy duty off-road type work vehicles having electric motor driven wheels, characterized as follows: (1) a reversing switch is actuated, or reversed, in response to speed of at least one wheel motor below a predetermined speed, without requiring waiting for reversal of polarity on the power buses; (2) a reversing switch is reversed in response to the speed of the slowest turning of two wheel motors, one on each side of the vehicle to effect uniform reversal of the vehicle, regardless of whether it is in a turn in either direction or moving straight ahead, and without requiring waiting for reversal of the polarity on the power buses; and (3) a reversing switch is actuated when the voltage drop across a slowest turning motor becomes low enough to operate a current sensitive relay connected with the reversing switches, the two wheel motors being connected such that there is no cross feed therebetween and in bucking relationship with a regulated voltage source to effect optimal response. Also disclosed are specific structure, interconnection, and operational details.

5 Claims, 2 Drawing Figures

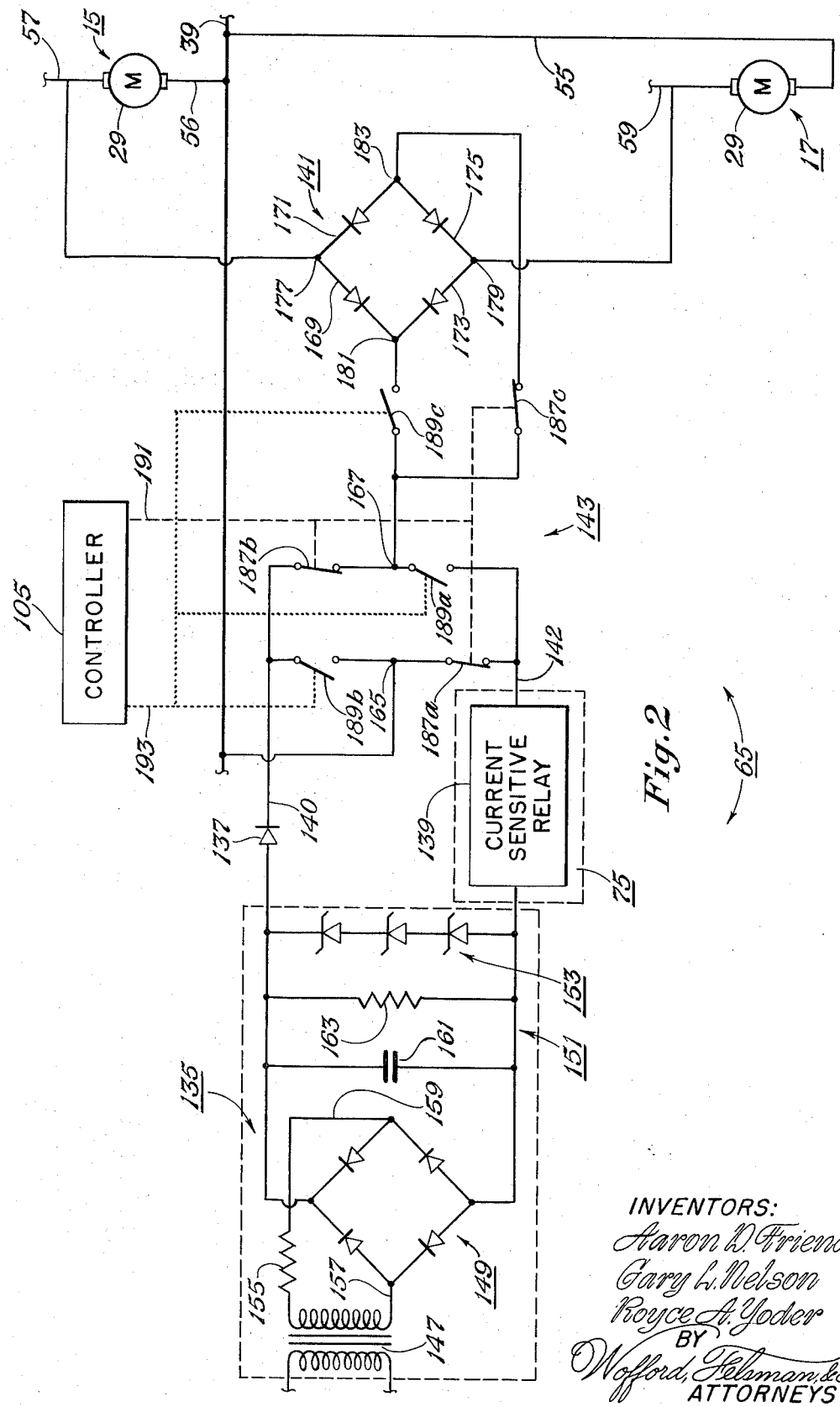

REVERSING CONTROL SYSTEM FOR ELECTRICALLY POWERED VEHICLES

BACKGROUND OF THE INVENTION

1. Field of the Invention

This invention relates to control systems for electrically powered vehicles; and, more particularly, to reversing control systems for controlling vehicles wherein the vehicle wheels are driven by electric motors which are supplied power from one or more generators, which are in turn powered by one or more prime movers such as internal combustion engines.

2. Description of the Prior Art

Many types of control systems have been devised in the prior art for various applications involving vehicles driven by electric traction motors supplied power from internal combustion driven generators, a notable example being diesel-electric trains. Although the general concept is quite old, the particular type application with which this invention is primarily concerned is relatively new insofar as actual practice is concerned. This application is that of the heavy duty type self-propelled, rubber-tired, off-road vehicle and/or mobile self-propelled work performing machine. Machines of this general class include, by way of example, off-road transport vehicles; earth moving and earth working machines such as scrapers, dozers, tractors and haulers; land clearing machines; logging machines; mobile cranes; heavy duty cranes or hoists. It is only recently that such machines have been electrically powered to a practical commercial extent; that is, having an internal combustion engine or engines driving a generator or generators to supply electrical power to vehicle wheel motors as well as to the other functions of the machine. The requirements for the electrical systems of such machines are quite severe. The electrical system of such machines must cope with wheel motor load and speed changes that are quite rapid and extend over a wide range. Further, it is very important that such machines have an effective dynamic braking system, since the braking demands are much too severe for frictional brakes alone.

U.S. Pats. Nos. 3,102,219, 3,417,304 and 3,492,556 disclose control systems for electrically powered vehicles of the type hereinbefore referred to. Improved vehicle control systems as well as improved dynamic braking systems have made desirable the anticipation and early switching of the reversing switch means to effect reversal of direction of a vehicle. Moreover, it was desired to effect a reversal that was substantially uniform so that the operator could judge the response of the vehicle, regardless of whether the vehicle was in a turn or moving straight ahead. Furthermore, the anticipatory reversal system effecting the uniform reversal of the vehicle needed to be as simple, compact and reliable as possible. Since this class of machines is relatively new, the prior art has not afforded adequate solutions to these needs.

BRIEF DESCRIPTION OF THE DRAWINGS

FIG. 2 is a partial schematic circuit diagram of one embodiment of this invention useful in the embodiment of FIG. 1.

DESCRIPTION OF PREFERRED EMBODIMENTS

Figure 1:
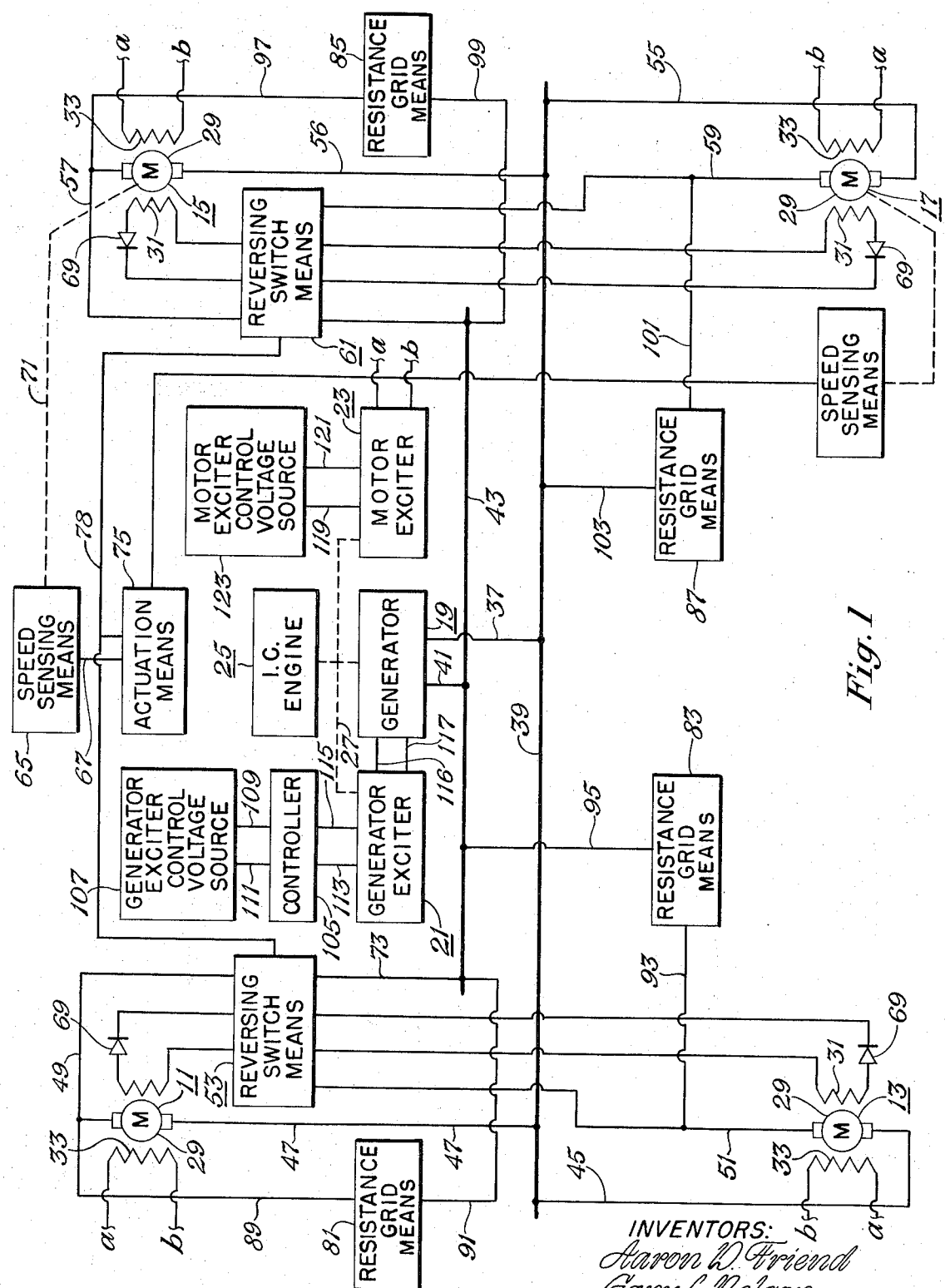
FIG. 1 is a block schematic diagram showing apparatus, control systems and arrangements in accordance with one embodiment of this invention.

It is a general object of this invention to provide control apparatus, systems, and arrangements which will result in improved performance in reversing the direction of travel of vehicles of the general class abovementioned.

It is an object of this invention to provide a reversing control system that reverses when the speed of the vehicle gets below a predetermined speed to provide a sort of preact and effect a faster reversal operation. Specifically, it is an object of the invention to accomplish the reversal when the speed of the slowest wheel of a pair of wheels disposed on opposite sides of the vehicle get below the predetermined speed.

It is an object of this invention to effect the reversal in response to vehicle speed by the use of a reversal system that is as simple, compact and reliable as possible.

These and other objects will become apparent to one skilled in the art when the following descriptive matter is read in conjunction with the drawings.

The term "vehicle" is used herein to include any vehicle to which the present invention is applicable, in addition to the wheel vehicles that are specifically discussed herein with reference to the description of preferred embodiments of this invention.

Referring to FIG. 1, there are shown four direct current traction or drive motors 11, 13, 15 and 17. These motors are incorporated into self-contained vehicle wheel drive units. Such wheel drive units include a gear reduction unit built into the wheel structure, with the traction motor driving the gear reduction unit. The wheel drive units are then mounted to the vehicle axles. For details of such wheel drive units (sometimes referred to as "electric wheels") reference is made to U.S. Pat. No. 2,726,726. For purposes of discussion herein, the wheeled vehicle of the illustrated preferred embodiments will be assumed to have four wheels, each of which is an electric wheel. It should be understood, however, that the present invention is applicable also to wheeled vehicles having either less or more than four electric wheels, as well as to pertinent vehicles that are not wheeled; for example, hoists.

Also shown in FIG. 1 are a generator 19, a generator exciter 21 and a motor exciter 23, all driven by an internal combustion engine 25 via conventional mechanical linkages, indicated by the dashed lines 27. While only one engine and generator are shown, the present invention is also applicable in cases where more than one engine-generator set is used. The present invention is also applicable in some of its aspects to vehicles wherein the prime mover power source is other than an internal combustion engine; for example, a turbine. The prime mover power source could in some applications be located remotely from the vehicle. The generator is preferably either a shunt type generator or a differential compound type generator. The generator has, of course, output terminals. Each of the direct current traction motors is preferably of the cumulative compound type, having an armature 29, a series field winding 31, a shunt field winding 33, and input terminals.

One output terminal of the generator 19 is connected via lead 37 to a first main line bus 39 and the other output terminal of the generator 19 is connected by a lead 41 with a second main line bus 43.

The left front wheel motor 13 has one side of its armature 29 connected via lead 45 to the first main line bus 39, and the right front wheel motor 11 has a corresponding side of its armature 29 connected via lead 47 with the first main line bus 39. The right and left front wheel motors 11 and 13 have their respective other side of their armatures 29 connected via respective leads 49 and 51, and reversing switch means 53 with the other main line bus 43.

Similarly, the left rear wheel motor 17 has one side of its armature 29 connected via lead 55 with the first main line bus 39, and the right rear wheel motor 15 has a corresponding side of its armature 29 connected via lead 56 with the first main line bus 39. The right and left rear wheel motors 15 and 17 have their respective other side of their armatures 29 connected via respective leads 57 and 59 and reversing switch means 61 with the other main line bus 43.

In brief, the front wheel motors 11 and 13, the rear wheel motors 15 and 17, and the output terminals of the generator 19 are all connected in parallel across the main line buses 39 and 43. Further, the series windings 31 of all of the wheel motors are arranged to be reversed by action of the respective first and second reversing switch means 53 and 61. Suitable reversing switch means and the interconnection of their respective contacts with the motors and their series fields are illustrated in the U.S. Pats. Nos. 3,102,217; 3,417,304; and 3,492,556, referenced hereinbefore. Any of the arrangements of the respective reversing switch means and the series fields 31 described in the above-referenced patents may be employed herein.

Referring to FIG. 1, each of the reversing switch means 53 and 61 is connected with an actuation means 75 that is linked to the respective reversing switch means, as shown by the lines 78. For example, the actuation means 75 may comprise a "current sensitive relay", illustrated as the block 139, FIG. 2. The current sensitive relay 139 is linked to respective contact set for each of the motors for which that reversing switch means serves. Each contact set is, in effect, a double pole double throw reversing switch.

In this invention, the actuation means 75 is actuated responsive to the speed of the vehicle to effect a faster reversal operation. Specifically, the actuation means 75 is connected with a speed sensing means 65 by suitable leads, illustrated as conductor 67. The speed sensing means 65 is responsively connected with at least one motor such as motor 15, as indicated by dashed line 71. As illustrated in FIG. 1, the actuation means 75 is connected via the respective speed sensing means with at least two wheels, one on each side of the vehicle. In this way, the slowest turning wheel motor will effect actuation of the actuation means 75, regardless of whether the vehicle is turning to the right, turning to the left, or moving straight ahead. Such uniformity of operation of the vehicle in reversal of direction is desirable in order that the operator gets a feel for the vehicle and not experience a different sensation for each operating condition of the vehicle. The speed sensing means 65 may be a tachometer-generator or the like that is mechanically coupled with the respective wheel motor and generates an output voltage in response to the speed of revolution of the wheel motor. In such an event, the actuation means may be activated when the voltage output of the tachometer-generator becomes low enough.

Preferably, however, a speed sensing means 65 and an actuation means 75 as illustrated in reversing control system of FIG. 2 are employed. The system of FIG. 2 will be described in detail after the remainder of the overall control system of FIG. 1 is described.

In the overall control system of FIG. 1, a plurality of dynamic braking resistance grid means are serially connected with the respective wheel motors for dissipating power developed by the motors when they are acting as respective generators to effect dynamic braking of the vehicle. The resistance grid means 81, 83, 85, and 87 are connected serially with the armatures 29 of the respective wheel motors 11, 13, 15 and 17 across the main line buses 39, 43. As illustrated, respective series circuits may be traced from the first main line bus 39, through the armatures of the respective wheel motors, the respective leads 49, 51, 57 and 59, and the respective resistance grid means. For example, the resistance grid means 81 is serially connected with the lead 49, from the other side of the armature 29 of wheel motor 11, via lead 89; and with main line bus 43 via lead 91. Similarly, the resistance grid means 83 is serially connected with lead 51 and the main line bus 43 via leads 93 and 95; the resistance grid means 85 is serially connected with the lead 57 and the main line bus 43 via leads 97 and 99; and the resistance grid means 87 is serially connected with the lead 59 and the main line bus 43 via leads 101 and 103. As can be seen in FIG. 1, the respective resistance grid means are also connected in parallel with the respective reversing switch means and the respective series field windings 31 such that the resistance grid means are effectively shunted by the series field windings 31 during normal dirving operation.

Referring to FIG. 1, a controller 105 is connected with a generator exciter control voltage source 107 and with the generator exciter 21 via respective leads 109 and 111, and 113 and 115 for control of the vehicle. As described in the cited Pat. No. 3,492,556, the controller may be a potentiometer that is arranged to have a voltage output that is continuously variable from zero up to a predetermined magnitude, both positive and negative. The controller may be operated manually in both directions or by a combination of foot-operated accelerator pedal and a reversing control switch at the operator's console. If desired, an interlock arrangement can be employed to prevent effective operation of the reversing control switch until the accelerator pedal is returned to its neutral, or idling, position. The controller is operable to provide excitation of the generator exciter 21. The generator exciter 21 is, in turn, connected with the generator 19 via leads 116 and 117 for controlling the output of the generator. The generator exciter control voltage source 107 will have several inputs from different sources, depending upon the degree of automation that is designed into the overall control system. For example, any of the controllers and generator exciter control voltage sources employed in either of the cited U.S. Pat. Nos. 3,102,219; 3,417,304; and 3,492,556 may be employed with this invention. Any other satisfactory generator exciter control voltage source and controller may be employed. It is sufficient herein to note that the controller 105 is operable by the operator of the vehicle to control forward and reverse direction and speed of the vehicle.

For control of the speed of the vehicle, a motor exciter control voltage source 123 is provided, which is connected with the motor exciter 23 via leads 119 and 121. The motor exciter control voltage source, will have a plurality of inputs, depending upon the degree of automation that is designed into the overall control system. One suitable and relatively simple motor exciter control voltage source is described in the cited Pat. No. 3,102,219. Other suitable but more complex motor exciter control voltage sources that employ inputs from a plurality of sensed variables, are described in the cited Pat. Nos. 3,417,304 and 3,492,556. Any other satisfactory motor exciter control voltage source may be employed. It is sufficient herein to note that the motor exciter control voltage source is operable to bring the vehicle speed to the speed signalled by the operator.

The output of motor exciter 23 is connected with the shunt field windings 33 of the respective wheel motors; as indicated by the leads *a* and *b*, drawn discontinuous for simplicity. The motor exciter 23 thus controls the speed of the wheel motors.

As indicated hereinbefore, a preferred form of the actuation means 75 and the speed sensing means 65 is illustrated in FIG. 2, wherein the actuation means 75 may be considered the portion enclosed by dotted lines and the speed sensing means for one wheel motor 15 may be considered the conductors 57, 58, 56, 39 and the speed sensing means for the other wheel motor 17 may be considered the conductors 59, 60, 55, 39. In FIG. 2 are illustrated serially connected regulated voltage power source 135, unidirectional conductor means 137, current sensitive relay 139, bridge means 141, switch means 143 and two parallel connected armatures 29 of wheel motors 15 and 17. The wheel motors 15 and 17 have one side connected with the first main line bus 39 via leads 55 and 56, as illustrated in FIG 1. Similarly, the other side of the motors 15 and 17 are connected with the other main line bus via leads 57 and 59 and reversing switch means 61.

The regulated voltage power source 135 is connectable in bucking relationship with the voltage drop across the armatures of the wheel motors 15 and 17. Basically, the regulated voltage power source comprises an isolation transformer 147; a full wave rectifier 149 connected with the isolation transformer for producing unidirectional current flow; and parallel-coupled ripple filter means 151 and zener diode means 153 for maintaining a regulated voltage. The regulated voltage power source 135 provides a voltage at its output terminals that is equal to the sum of the voltage drop across a respective wheel motor armature at a predetermined low speed at which it is desired to effect reversal of the reversing switch means and the voltage drop across the current sensitive relay when the minimum current sufficient to effect actuation thereof is flowing therethrough. It has been found for example, that a voltage supply of about 75 volts affords a satisfactory voltage output of the regulated voltage power source. Specifically, the output of the isolation transformer 147 is serially connected via voltage dropping resistor 155 and leads 157 and 159 with the input terminals of the full wave rectifier 149. As illustrated, the full wave rectifier 149 comprises a diode bridge, although any other satisfactory full wave rectifier may be employed. As illustrated, the output terminals of the full wave rectifier are connected in parallel with a ripple filter comprising parallel-coupled capacitor 161 and resistor 163. Also coupled in parallel with the ripple filter are a plurality of serially connected zener diodes in the zener diode means 153 for effecting a predetermined regulated voltage. The output terminals of the regulated voltage source 135 are connected in series with unidirectional conductor means 137, switch means 143, bridge means 141, parallel connected armatures of motors 15, 17 and current sensitive relay 149. The diode 137 and bridge 141 prevent reverse current flow, and specifically prevents current from flowing through the current sensitive relay when the armature voltage of either wheel motor exceeds the voltage of the regulated voltage power source.

The current sensitive relay 139 has a fixed resistance and a biasing means such that the relay will be actuated when a predetermined current flows therethrough, as when a predetermined voltage drop is effected across the relay. For example, it has been found satisfactory to employ a relay that will operate when about 3 milliamperes of current flows therethrough, requiring a voltage drop of about 45 volts across the relay. If desired, a series resistance-capacitance network may be employed in parallel with the relay to alleviate problems with the noise spikes caused by closing or opening of the contacts of the reversing switch means, actuated by the current sensitive relay 139.

The bridge means 141 will select the slowest motor to be serially connected into the circuit in bucking relationship with the regulated voltage power source 135. The bridge means 141 has four legs, two adjacent legs 169 and 171 on one side and two adjacent legs 173 and 175 on the other side. The juncture of the two adjacent legs; for example, 169 and 171; define input terminals 177 and 179. The juncture of the first legs 169 and 173 define an output terminal 181, whereas the juncture of the second legs 171 and 175 define a second output terminal 183. The first leg, such as leg 169, of a respective side of the bridge has a unidirectional conductor means for current flow in one direction with respect to the input terminal of that side, and the second of the adjacent legs has a unidirectional conductor means for permitting current flow in the other direction with respect to the input terminal on that side. As illustrated, the unidirectional conductors are diodes, appropriately poled. Thus, it can be seen that the bridge means 141 comprises a diode bridge means which allows current flow in either direction through both motors, but which will automatically select the path of the slowest turning motor; that is, the motor having the lowest bucking voltage output thereacross; to connect in series with the regulated voltage power source 135, the diode 137 and the current sensitive relay 139. The diodes in the legs of bridge means 141 also serve to isolate the respective motors to prevent cross feed therebetween.

The switch means 143 serves to maintain the regulated voltage power source 135 connected in a signalled bucking relationship with the wheel motor outputs 15 and 17 regardless of the direction of travel of the vehicle. The switch means comprises a first group of switches 187*a*, 187*b* and 187*c;* and a second group of switches 189*a*, 189*b* and 189*c*. The first group of switches 187*a–c* are responsively connected as shown by the dashed line 191 with a controller means such as controller 105 for serially connecting a first output terminal such as output terminal 183 of the bridge means 141, the wheel motors 15 and 17, the regulated voltage power source 135, and the current sensitive relay 139 for current flow in one direction through the wheel motors. The second group of switches 189*a–c* are responsively connected, as shown by the dotted line 193 with the controller 105 for serially connecting a second output terminal 181 of the bridge means, the wheel motors 15 and 17, the regulated voltage power source 135 and the current sensitive relay 139 for current flow in a second direction through the wheel motors. When the first group of switches 187a–c is closed, a circuit may be traced from one output terminal of the regulated voltage source 135 via diode 137, switches 187b and 187c to terminal 183 and from terminals 177 and 189 through armatures of respective motors 15, 17 to bus 39, and from bus 39 via switch 187a and current sensitive relay 139 to the other output terminal of the regulated voltage source 135. When the second group of switches 189a–c is closed, a circuit may be traced from one output terminal of the regulated voltage source 135 via diode 137 and switch 189b to bus 39 and from bus 39 through armatures of respective motors 15, 17 to terminals 177, 179 and from terminal 181 via switches 189c and 189a and current sensitive relay 139 to the other output terminal of the regulated power source.

Operation of the electrically powered vehicle control system in accordance with this invention will now be explained. The positions of the controls as shown in FIG. 1 represent the condition wherein the vehicle is parked and ready for movement in the forward direction. The electric wheel motors of the vehicle are preferably provided with electromagnetic friction brakes (not shown) of a type which may be set or released by the vehicle operator, as desired, and particularly for parking the vehicle.

Vehicle Forward Operation

Assuming that the vehicle engine 25 is running and that it is desired to move the vehicle forward, it is only necessary to move the controller 105 away from its neutral position in the forward direction a desired amount. A direct current voltage of proper polarity will immediately be applied to the field of the generator exciter 21; which, in turn, will cause the generator exciter to supply direct current voltage of proper polarity to the generator shunt field, whereupon the generator output voltage will appear across the main line buses 39 and 43. The main line bus voltage (generator output voltage) is of course applied to the armatures of all of the wheel motors.

The wheel motor shunt fields 33 are supplied direct current voltage from the output of the motor exciter 23 via leads a and b. For additional detaisl as to the motor excitation control system, reference is made to the cited Pat. Nos. 3,093,780 and 3,102,219.

Thus, with armature voltage and shunt field excitation applied to the motors, the vehicle will move forward. Assuming that the vehicle initially is lightly loaded, the generator maximum voltage output will be relatively high, the motor shunt field excitation will be relatively low, allowing the vehicle to run under what might be termed high speed, low torque conditions. For the initially assumed light load condition, the further the main controller 105 is advanced away from neutral, the faster the vehicle will travel. With the controller 105 fully advanced, the generator output will be maximum and the motor shunt field excitation will be minimum, and the vehicle speed will be maximum. The motor exciter may be provided a pilot shunt field (not shown) to prevent complete collapse of the motor shunt fields. When the vehicle is operating under heavy load conditions, the generator maximum output voltage is reduced, resulting in high motor shunt field excitation. This may be termed the low speed, high torque operating condition. To stop the vehicle forward motion, it is only necessary to return the controller 105 to its neutral position.

Vehicle Dynamic Braking Operation

Dynamic braking action is automatically effected when the wheel motors exceed the signalled speed of operation of the vehicle. The dynamic braking action is controlled by operation of the controller 105. The detailed circuits and operation of typical suitable controllers have been described particularly in referenced Pat. Nos. 3,102,219 and 3,417,304, and do not, per se, form a part of this invention. Accordingly, no detailed description is herein included. Briefly stated, however, a dynamic braking signal effects reduction of the generator exciter shunt field. The motor series fields 31 are rendered inactive by diodes 69 during the dynamic braking operation, since the series fields 31 are in bucking relation to the shunt fields 33 during dynamic braking and otherwise would decrease the effectiveness of the motors when they are acting as generators. The power generated by the wheel motors during dynamic braking is dissipated by the respective resistance grid means 81, 83, 85 and 87; and by the generator 19, which is now acting as a motor driving internal combustion engine 25. The efficiency of the generator 19 as a motor is such that it will drive the load provided by the internal combustion engine 25 within a narrow range of speed near the normal engine operating speed. This means that the engine is ready at all times to immediately pick up its generator load when the dynamic braking signal is removed.

The respective resistance grid means are connected in series with the wheel motors, now acting as generators, to begin immediate dissipation of the energy of dynamic braking to minimize a tendency to overdrive the generator 19 in the internal combustion engine 25.

The dynamic braking is effective, not only in forward operation but also in reverse operation.

Vehicle Reverse Operation

To move the vehicle in the reverse direction, it is only necessary to move the controller away from its neutral position in the "reverse" direction a desired amount. Tis will cause a voltage of opposite polarity to be applied to the generator exciter 21; which will, in turn, apply the voltage of opposite polarity to the generator shunt field, causing the generator output voltage to reverse its polarity. The vehicle can, of course, go to the reverse direction of operation from a standstill, but can also go from forward operation to reverse operation and vice versa.

Assume the vehicle is moving forward in a turn to the left and it is desired to reverse the direction of travel. The operator signals the reversal of the machine; as by moving a control lever in a reverse direction, or by flicking a reversing switch to reverse position and allowing the accelerator pedal to return to the neutral position. This effects closure of the switches 187a–c, as illustrated in FIG. 2. The left wheel motor 17 is the slowest turning motor in the left turn. As long as the voltage sensed by the input terminal 179, and consequently, the bucking terminals 165 and 167, is too high, there will be inadequate current flow through the current sensitive relay 139 to actuate it. As the vehicle slows, however, and the armature voltage of the left wheel motor 17 decreases, a sufficient current will flow via the diode in leg 175, through the wheel motor 17 and through the current sensitive relay 139 to cause its actuation. For example, it has been found satisfactory to employ a circuit in which reversal is effected when armature voltage of a wheel motor decreases to the value of approximately 35 volts, 5 volts being taken up by components of the circuit, rendering the effective bucking voltage only 30 volts. Upon actuation of the current sensitive relay 139, serving as a part of the actuation means 75, the reversing switch means 53 and 61 will be actuated and the vehicle is set up for reverse motion.

After the vehicle has travelled in the reverse direction a desired distance, the operator will signal forward operation by moving his controller oppositely to the direction described hereinbefore. Accordingly, the switches 189a–c will be closed and the switches 187a–c will be opened. Thus, the diode 137 will be connected via bucking terminal 165 with the first main line bus 39 and the current sensitive relay 139 will be connected via bucking terminal 167 with the output terminal 181 of the bridge means 141. Again, when the slowest turning motor attains a voltage low enough, a sufficient current will flow through the current sensitive relay 139 and actuate the reversing switch means 53 and 61 to set up the vehicle for forward operation.

In some applications it may be desirable, instead of sensing motor armature voltage directly, to sense a voltage which is a function of the motor armature voltage, as for example, the voltage drop across a resistance grid means. Further, if desired, a solid state gating device could be utilized instead of the current sensitive relay, in which case the result of the voltage of the regulated voltage source and that applied to bucking terminals 165, 167 would be used to control the triggering of the gating device.

General

From the foregoing description and drawings, it can be seen that this invention provides an improved reversing control system for an electrically powered vehicle. In one aspect of the invention, the reversal of the vehicle is effective in response to speed of movement of the vehicle, as sensed from at least one wheel. In another aspect of the invention, the speed of the vehicle is sensed from at least two wheels disposed on opposite sides of the vehicle so as to obtain uniformity of response of the reversal of the vehicle, regardless of whether the vehicle is moving straight ahead or turning in one direction or the other. In a further aspect of the invention, the speed sensing means comprises a voltage sensing means and a circuit in which the armature voltages of two wheel motors are connected in bucking relationship with a regulated voltage source so as to effect a sufficient flow of current to actuate a current sensitive relay when the armature voltage of the slowest turning wheel motor drops below a predetermined voltage. The invention herein disclosed accomplishes the objects delineated hereinbefore and satisfies the needs which the prior art has not satisfied.

It will be understood that the showing of the respective blocks, switches, relays, controllers, power sources and the like are schematic only and may be modified in various ways as will be apparent to those skilled in the art, without departing from the principles of the invention. Thus, the foregoing disclosure and the showings made in the drawings are merely illustrative of the principles of this invention and are not to be interpreted in a limiting sense.

What is claimed is:

1. A control system for an electrically powered, self-propelled vehicle comprising in combination:
   a. a prime mover power source;
   b. a direct current generator having a shunt field;
   c. means for supplying excitation to said generator shunt field;
   d. means mechanically coupling said generator to said power source;
   e. a direct current electric drive motor having a shunt field and a series field;
   f. conductor means operably connecting output terminals of said generator with input terminals of said motor;
   g. means for supplying excitation to said motor shunt field;
   h. means, including a controller, connected with said generator excitation means for signalling direction and speed of said vehicle by signalling the polarity and magnitude of power to be supplied from said generator to said motor;
   i. means connected with said motor excitation means for signalling the magnitude of excitation to be supplied to said motor shunt field;
   j. reversing switch means for effecting reversal of said motor series field connections immediately prior to reversal of direction of said vehicle so as to maintain the desired direction of current flow through said series field;
   k. actuation means connected with said reversing switch means for actuating said reversing switch means;
   l. means for deriving a voltage signal which is a function of the armature voltage of said motor and utilizing said signal to effect actuation of said actuation means when the speed of said motor decreases to or is below a predetermined speed.

2. A control system for an electrically powered, self-propelled vehicle comprising in combination:
   a. a prime mover power source;
   b. a direct current generator having a shunt field;
   c. means for supplying excitation to said generator shunt field;
   d. means mechanically coupling said generator to said power source;
   e. a plurality of direct current electric wheel drive motors each having a shunt field and a series field;
   f. conductor means operably connecting output terminals of said generator with input terminals of said wheel motors;
   g. means for supplying excitation to said wheel motor shunt fields;
   h. means, including a controller, connected with said generator excitation means for signalling direction and speed of said vehicle by signalling the polarity and magnitude of power to be supplied to said wheel motors;
   i. means connected with said motor excitation means for signalling the magnitude of excitation to be supplied to said wheel motor shunt fields;
   j. reversing switch means for effecting reversal of said respective motor series field connections immediately prior to reversal of direction of said vehicle so as to maintain the desired direction of current flow through said series field;

k. actuation means connected with said reversing switch means for actuating said reversing switch means;

l. means for deriving a voltage signal which is a function of the armature voltage of one of said motors and utilizing said signal to effect actuation of said actuation means when the speed of said motor decreases to or is below a predetermined speed.

3. A control system for an electrically powered, self-propelled vehicle comprising in combination:

a. a prime mover power source;
b. a direct current generator having a shunt field;
c. means for supplying excitation to said generator shunt field;
d. means mechanically coupling said generator to said power source;
e. a plurality of direct current electric wheel drive motors each having a shunt field and a series field;
f. conductor means operably connecting output terminals of said generator with input terminals of said wheel motors;
g. means for supplying excitation to said wheel motor shunt fields;
h. means, including a controller, connected with said generator excitation means for signalling direction and speed of said vehicle by signalling the polarity and magnitude of power to be supplied to said wheel motors;
i. means connected with said motor excitation means for signalling the magnitude of excitation to be supplied to said wheel motor shunt fields;
j. reversing switch means for effecting reversal of said motor series field connection immediately prior to reversal of direction of said vehicle so as to maintain the desired direction of current flow through said series field;
k. actuation means connected with said reversing switch means for actuating said reversing switch means;
l. means connected with at least two wheel motors, one on each side of said vehicle for deriving respective voltage signals which are a function of the armature voltage of respective said last mentioned motors, and utilizing said signals to effect substantially uniform actuation of said actuation means when the speed of a said wheel motor decreases below a predetermined speed, regardless of whether said vehicle is turning in either direction or moving straight ahead.

4. A control system for an electrically powered, self-propelled vehicle comprising in combination:

a. a prime mover power source;
b. a direct current generator having a shunt field;
c. a first means for supplying excitation to said generator shunt field;
d. second means mechanically coupling said generator to said power source;
e. a plurality of direct current eletric wheel drive motors each having a shunt field and a series field;
f. third means comprising conductor means operably connecting output terminals of said generator with input terminals of said wheel motors;
g. fourth means for supplying excitation to said wheel motor shunt fields;

h. fifth means, including a controller, connected with said generator excitation means for signalling direction and speed of said vehicle by signalling the polarity and magnitude of power to be supplied to said wheel motors;

i. sixth means connected for signalling the magnitude of excitation to be supplied to said wheel motor shunt fields;

j. reversing switch means for effecting reversal of said respective motor series field connections immediately prior to reversal of direction of said vehicle so as to maintain the desired direction of current flow through said series field;

k. actuation means connected with said reversing switch means for actuating said reversing switch means; said actuation means comprising a current sensitive relay operable when a current greater than a predetermined minimum current flows therethrough;

l. means connected with at least two wheel motors, one on each side of said vehicle for deriving respective voltage signals which are a function of the armature voltage of respective said last mentioned motors, and utilizing said signals to effect substantially uniform actuation of said actuating means when the speed of a said wheel motor decreases below a predetermined speed, regardless of whether said vehicle is turning in either direction or moving straight ahead; said speed responsive means comprising:

i. a regulated voltage power source that is connectable in bucking relationship with the voltage drop across said wheel motors; said wheel motors being connected in parallel; said regulated voltage power source being adapted to supply a voltage greater than the sum of the voltage drop across a respective wheel motor at said predetermined speed and the voltage drop across said current sensitive relay when said predetermined minimum current flows therethrough;

ii. unidirectional conductor means serially connected with said regulated voltage source and said current sensitive relay;

iii. bridge means for selecting the slowest turning wheel motor to be serially connected with said regulated voltage power source and said current sensitive relay; said bridge means having four legs, respective sides of said bridge means comprising two adjacent legs having an input terminal that is serially connected with a respective said wheel motor; a first leg of said adjacent legs having a unidirectional conductor means for permitting current to flow in one direction with respect to said input terminal and the second of said adjacent legs having a unidirectional conductor means for permitting current to flow in the other direction with respect to said input terminal; the juncture of said first legs of said sides defining a first output terminal, and the juncture of said second legs of said sides defining a second output terminal; and iv. switch means for maintaining said regulated voltage power source connected in a signalled bucking relationship with said wheel motors regardless of the direction of travel of said vehicle; said switch means comprising a first group of switches responsively connected with said fifth means for serially connecting a first output terminal of said bridge means, said wheel motors, said regulated voltage power source, and said current sensitive relay for current flow in one direction through said wheel motors; and a second group of switches responsively connected with said fifth means for serially connecting a second output terminal of said bridge means, said wheel motors, said regulated voltage power source, and said current sensitive relay for current flow in a second direction through said wheel motors.

5. The control system of claim 4 wherein said regulated voltage power source, said unidirectional conductor, and said current sensitive relay are serially connected with a pair of bucking terminals; and wherein said switch means comprises three pair of contacts, only one contact of each said pair being closed at a time; one pair of said contacts being disposed intermediate and connected with said pair of bucking terminals and one side of said regulated voltage power source; a second pair of said contacts being disposed intermediate and connected with said pair of bucking terminals and the other side of said regulated voltage power source; and the third pair of said contacts connected with one of said bucking terminals and the respective output terminals of said bridge means, one contact of said third pair being connected with one output terminal and the other contact of said third pair being connected with the other output terminal; said other bucking terminal being connected with the sides of said wheel motors opposite to the sides that are connected with respective input terminals of said bridge means.

* * * * *